United States Patent
Sacca et al.

(10) Patent No.: US 6,731,749 B1
(45) Date of Patent: May 4, 2004

(54) TELEPHONE LINE INTERFACE CIRCUIT WITH INTELLIGENT LINE CURRENT AND VOLTAGE CONTROL

(75) Inventors: Frank Sacca, Diamond Bar, CA (US); Raphael Rahamim, Orange, CA (US); James Bunde Villadsen Skov, Laguna Niguel, CA (US); Eric Floyd Riggert, Trabuco Canyon, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/312,412

(22) Filed: May 14, 1999

(51) Int. Cl.[7] .................................................. H04M 7/04
(52) U.S. Cl. ..................... 379/398; 379/394; 379/395.9; 379/412; 379/413
(58) Field of Search .................... 379/395.01, 412, 379/413, 394, 398; 307/44, 52

(56) References Cited

U.S. PATENT DOCUMENTS

| | | | |
|---|---|---|---|
| 4,359,609 A | * 11/1982 | Apfel | 379/398 |
| 4,528,424 A | 7/1985 | Middleton et al. | 379/183 |
| 4,607,140 A | 8/1986 | Schorr | 379/400 |
| 4,607,141 A | 8/1986 | Schorr | 379/398 |
| 4,993,063 A | 2/1991 | Kiko | 379/405 |
| 5,349,638 A | 9/1994 | Pitroda et al. | 379/142.16 |
| 5,351,289 A | 9/1994 | Logsdon et al. | 379/142.04 |
| 5,361,296 A | 11/1994 | Reyes et al. | 379/93.29 |
| 5,369,666 A | 11/1994 | Folwell et al. | 375/222 |
| 5,473,552 A | 12/1995 | Chen et al. | 375/222 |
| 5,544,241 A | 8/1996 | Dibner et al. | 379/373.01 |
| 5,546,448 A | 8/1996 | Caswell et al. | 379/142.05 |
| 5,675,640 A | 10/1997 | Tappert et al. | 379/374.01 |
| 5,737,397 A | 4/1998 | Skinner et al. | 379/93.29 |
| 5,764,694 A | 6/1998 | Rahamim et al. | 375/224 |
| 5,771,281 A | 6/1998 | Batten, Jr. | 379/93.23 |
| 5,781,621 A | 7/1998 | Lim et al. | 379/142.04 |
| 5,790,656 A | 8/1998 | Rahamim et al. | 379/399.01 |
| 5,796,815 A | 8/1998 | Guercio et al. | 379/372 |
| 5,799,060 A | 8/1998 | Kennedy et al. | 379/29.05 |
| 5,912,513 A | * 6/1999 | Hollenbach et al. | 379/413 |

FOREIGN PATENT DOCUMENTS

FR    2 403 690    9/1977

OTHER PUBLICATIONS

The LM3900: A New Current Differencing quad of +/− Input Amplifiers, National Semiconductor Application Note 72, Sep. 1972, p. 35.*

* cited by examiner

*Primary Examiner*—Minsun Oh Harvey
*Assistant Examiner*—Daniel Swerdlow
(74) *Attorney, Agent, or Firm*—Farjami & Farjami LLP

(57) ABSTRACT

A telephone line interface circuit is disclosed having intelligent line current control that can adjust to the various requirements of worldwide telephone systems (DC masks), and/or can reduce the power consumed by the interface circuit. A controller reads a voltage value and based on the theoretical model of a telephone line network, and the expected current/voltage characteristic, as dictated by the appropriate DC mask. The controller sets the line current (via an output voltage) to an optimum value and causes the line voltage to adjust so as to comply with the DC mask and/or minimize power dissipation in the circuit.

36 Claims, 16 Drawing Sheets

US 6,731,749 B1

TELEPHONE LINE INTERFACE CIRCUIT WITH INTELLIGENT LINE CURRENT AND VOLTAGE CONTROL

CROSS-REFERENCE TO RELATED APPLICATIONS

This application is related to the following U.S. Patent Applications: U.S. patent application Ser. No. 09/212,707, entitled TELEPHONE LINE INTERFACE CIRCUIT WITHOUT HOOKSWITCH, filed Dec. 16, 1998; U.S. patent application Ser. No. 09/312,136 entitled ELECTRONIC INDUCTOR WITH TRANSMIT SIGNAL TELEPHONE LINE DRIVER, filed May 14, 1999; U.S. patent application Ser. No. 09/312,218 entitled TELEPHONE LINE INTERFACE CIRCUIT WITH VIRTUAL IMPEDANCE, filed May 14, 1999; U.S. application Ser. No. 09/312,178 entitled METHOD AND APPARATUS FOR DIGITAL PABX DETECTION AND MODEM INTERFACE PROTECTION, filed May 14, 1999. All of these applications are commonly owned by the assignee of the present application. The disclosure of all those applications are explicitly incorporated herein by reference.

BACKGROUND OF THE INVENTION

1. Field of the Invention

The present invention relates generally to the field of modem circuits, and more particularly, to a telephone line interface circuit.

2. Description of Related Art

Existing telephone line interface circuits use a passive network in the electronic inductor (EI) which provides feedback from the Tip and Ring voltage to the transistor's bias and adjusts the line current so that the line voltage is maintained as low as possible. The circuit power dissipation is then calculated by using the worst-case voltage and current values. Components satisfying the maximum power requirements are then used. This power rating can be substantially higher than the rating that could be achieved by using an "intelligent" control of the current and voltage.

Additionally, problems arise when designing telephone line interface circuits for worldwide applications due to the specific V-I characteristics (i.e. requirements) of the telephone lines in different countries. These various V-I characteristics are commonly defined as "DC masks." Specifically, various countries have different requirements as to the minimum and/or maximum levels of DC off-hook line voltage permissible for a given Tip and Ring circuit. For example, in the United States, the DC line current cannot exceed 6.6 volts at 20 mA. In France, the DC line current cannot exceed 60 mA while the voltage can be as high as 40 volts. Examples of various DC masks are shown in FIGS. 10(A)–10(D). The solid line on each graph represents a particular V-I boundary constraint within which the interface circuit must operate. These DC mask requirements, however, cannot be met with a single passive network.

Thus, there is a need for an intelligent line current control which can reduce the power rating over conventional telephone line circuits, and which can comply with various worldwide DC masks using a single circuit.

SUMMARY OF THE INVENTION

The present invention provides intelligent line current and voltage control that can adjust to the various requirements of worldwide telephone systems, and/or can reduce the power consumed by the interface circuit. In a basic configuration (FIG. 1), a voltage divider is connected across the rectified Tip and Ring voltage (VTR) and provides feedback of the line voltage Vtr to an electronic inductor and to an analog-to-digital converter (ADC) 10. The output of the ADC 10 is then provided to a controller 30. The controller 30 may be implemented as a microcontroller, using either hardware or software control. Based on the theoretical model of a telephone line network and the expected voltage/current characteristic, as dictated by the appropriate DC mask, the controller 30 sets the line current to an optimum value (via an output voltage) VDAC and causes the line voltage to adjust so as to minimize power dissipation in the circuit. The controller 30 can set the line current precisely via a digital-to-analog converter (DAC) 20, by changing the voltage at the base terminal of the electronic inductor transistor Q1 and measuring the emitter voltage Ve. The line current will be equal to the emitter voltage Ve divided by the emitter resistor Re.

Furthermore, the controller 30 can calculate the power dissipation in the emitter resistor Re from the value of the emitter voltage Ve, and determine the power dissipation in the transistor Q1. While determining the optimum voltage/current line setting, the controller 30 also takes into account the specific requirements of a particular DC mask, depending upon the country of operation. A switch S1 is enabled to increase the dynamic range of the ADC 10 with respect to VTR, by adding a resistor R3 in parallel with R2 so that a relatively large VTR can be measured within the limited voltage range of the ADC 10 (typically 0–4V).

In an alternative embodiment (FIG. 2), the ADC 10 reads the current between tip and ring directly from the emitter of the transmitter Q1 by measuring Ve and dividing by Re. The controller 30 can select either switch S2 or S3 to read either voltage Vtrdc or Ve. In other embodiments, various feedback lines, controlled by the controller 30, are used to provide for greater current control. The electronic inductor transistor may also be configured as a Darlington pair. Various switches may be added to provide greater control over the operating range of the interface circuit, and are controlled by the controller 30.

The control logic of the controller may be implemented in software, and the circuit adjusted using either a static, dynamic or static-dynamic combination control method.

BRIEF DESCRIPTION OF THE DRAWINGS

The exact nature of this invention, as well as its objects and advantages, will become readily apparent from consideration of the following specification as illustrated in the accompanying drawings, in which like reference numerals designate like parts throughout the figures thereof, and wherein.

DETAILED DESCRIPTION OF THE PREFERRED EMBODIMENTS

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a telephone line interface circuit with intelligent line current control.

Figure 3:
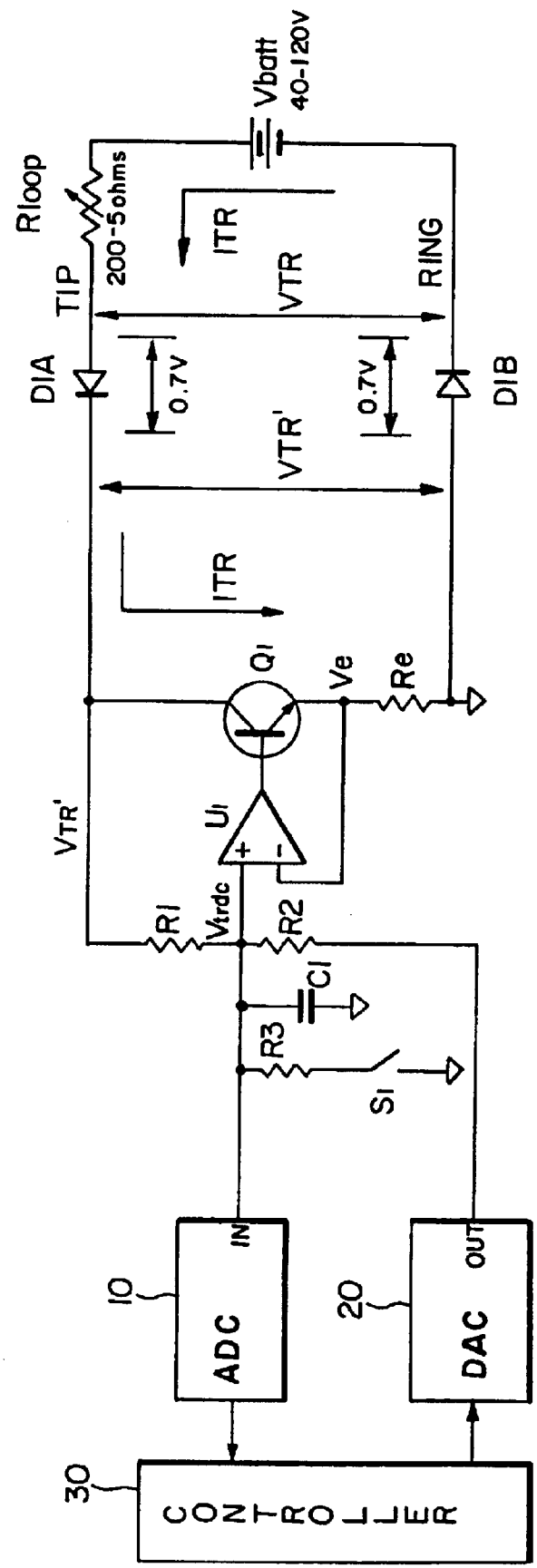
FIG. 3 is a schematic diagram of the equivalent DC circuit for the telephone line and modem line interface.

The basic principles of the present invention may be understood with reference to FIG. 3.

Figure 1:
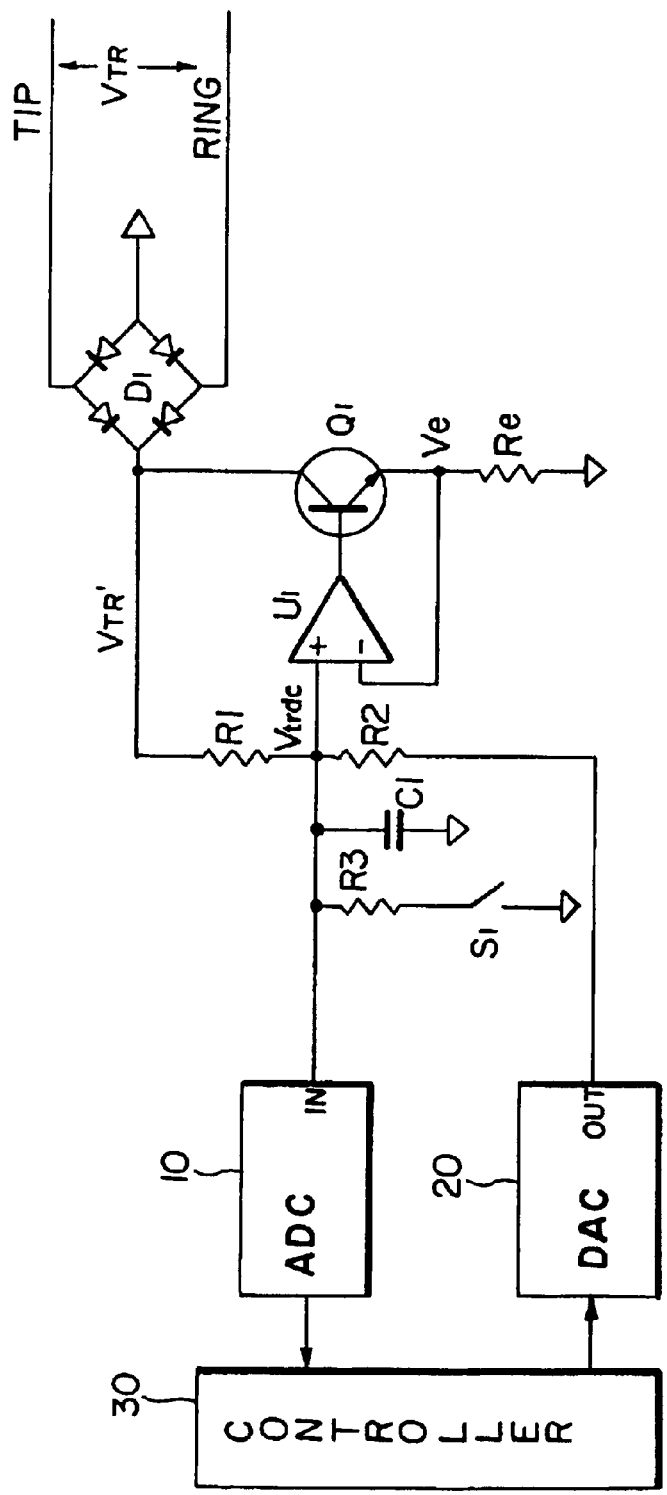
FIG. 1 is a schematic diagram of a telephone line interface circuit with DC line voltage control according to the present invention.

FIG. 3 is a schematic diagram of the circuit of FIG. 1 and includes the DC equivalent circuit for a telephone company central office network (CO). The DC characteristic of the CO can be modeled as a voltage source Vbatt, in series with a loop resistance Rloop. Diode bridge D1, part of the modem telephone line interface, can be modeled as two diodes D1A and D1B, equivalent to a voltage drop of approximately 1.4V.

Resistors R1 and R2 form a resistor divider with respect to voltage VTR', and their value is chosen to be very large to make the current through them negligible compared to the current through Q1. Therefore, the current through Q1 is equal to the line current Itr. An operational amplifier U1 converts the voltage Vtrdc to the current required to drive the base of the transistor Q1, and the negative input of U1 is connected to Ve, the emitter voltage of Q1, effectively making the voltage at node Vtrdc equal to Ve (virtual ground property of operational amplifiers). Since the base current of Q1 is negligible compared to the line current ITR, the value of ITR can be calculated as Ve (voltage across Re) divided by the value of Re. In this configuration, the transistor/operational amplifier configuration operates as a voltage-controlled current source (VCCS).

When the modem is on-hook, switch S1 is enabled, placing resistor R3 in parallel with resistor R2, U1 is disabled, and transistor Q1 is turned off (ITR=0).

When the modem goes off-hook, U1 is enabled, and the voltage feedback from Tip and Ring at Vtrdc causes line current ITR to flow through Q1.

An analog-to-digital converter (ADC) 10 reads the voltage at Vtrdc, and based on this reading the controller 30 determines the voltage at Tip and Ring, VTR, according to the following equations:

$$VTR = VTR' + 1.4V$$

$(VTR' - Vtrdc)/R1 = (Vtrdc - VDAC)/R2$, which solved for $VTR'$ yields $VTR' = (R1/R2) \times (Vtrdc - VDAC) + Vtrdc$, and therefore $$VTR = (R1/R2) \times (Vtrdc - VDAC) + Vtrdc + 1.4V \quad [1]$$

The factor (R1/R2) is herein referred to as the electronic inductor "multiplier." If switch S1 is enabled, the value of R2 is substituted with the parallel combination of R2 and R3, or R2//R3.

The controller 30 can also measure the line current at any point in time by using the ADC reading according to the following equation:

$ITR = Ve/Re$. Since $Vtrdc = Ve$, then $$Itr = Vtrdc/Re \quad [2]$$

Therefore, the controller 30 can monitor both the line voltage and line current at any point in time, by using the same ADC reading at node Vtrdc.

When the modem is on-hook, ITR is equal to zero and VTR represents the battery voltage at the CO (there is no voltage drop across the loop resistance). Hence, $$VTR(\text{on-hook}) = Vbatt \quad [3]$$

When the modem is off-hook, the controller 30 calculates both VTR and ITR based on the steady-state ADC reading, and then estimates the loop resistance Rloop according to the following equations:

$(Vbatt - VTR)/Rloop = ITR$, which solved for $Rloop$ yields $$Rloop = (Vbatt - VTR)/ITR \quad [4]$$

Equations [1], [2], [3], and [4] form the basis for two independent methods of controlling the line voltage as a function of the line current. Specifically, equations [1] and [2] can be used to implement "dynamic" DC voltage control, whereas equations [3] and [4] combined with [1] and [2] can be used to implement "static" DC voltage control.

In the dynamic method, the modem goes off-hook and the controller 30 sets an arbitrary initial DAC 20 setting, which results in a known VDAC voltage and switches the modem off-hook. The ADC 10 then measures voltage Vtrdc, and the controller 30 uses equation [1] to calculate VTR and equation [2] to calculate ITR. If the value of VTR is outside the range specified by the DC mask at the current ITR, the controller 30 increases VDAC to decrease VTR or decreases VDAC to increase VTR, respectively.

The DAC setting can be changed one bit at a time or in larger steps first and single bits later, depending on the difference between the VTR measured and the target value, and the process continues until VTR is within a specified range of the target value. On each iteration, the controller 30 recalculates ITR, as this value changes when the DAC 20 setting changes.

In the static method, the controller 30 sets an arbitrary initial DAC setting which results in a known VDAC voltage and uses equation [3] to measure Vbatt while the modem is on-hook, immediately before going off-hook. When the modem goes off-hook, the controller 30 measures voltage Vtrdc, and uses equations [1] and [2] to calculate VTR and ITR, respectively. Using equation [4], the controller then calculates Rloop. Since, $VTR = Vbatt - ITR \times Rloop$, where $ITR = Vtrdc/Re$, then $VTR = Vbatt - (Vtrdc/Re) \times Rloop$, which solved for Vtrdc yields $$Vtrdc = (Vbatt - VTR) \times (Re/Rloop) \quad [5]$$

Substituting the expression for Vtrdc from equation [5] into equation [2] yields $$VDAC = (R2/R1)[Vbatt(Re/Rloop)(1+R1/R2) -$$
$$VTR(1+R1 \times Re/R2 \times Rloop + Re/Rloop) + 1.4] \quad [6]$$

Equation [6] relates the value of the DAC setting VDAC to line voltage VTR, assuming that Vbatt and Rloop are known. Using equation [6], therefore, the controller 30 can calculate the DAC setting as a function of the target value for VTR. The target value for VTR is based on the DC mask requirements and other considerations, such as power and distortion. The controller 30 has stored values for the DC masks shown in FIGS. 10(A)–10(D), as well as the maximum power curve 13 of the transistor Q1, illustrated in FIG. 11.

In both methods, the controller 30 always calculates the power dissipation in the modem line interface as $$Pmodem = VTR \times ITR \quad [7]$$

and adjusts the DAC 20 setting so that the condition Pmodem<Pmax is satisfied, where Pmax if the maximum power rating of the modem line interface.

Figure 4A:
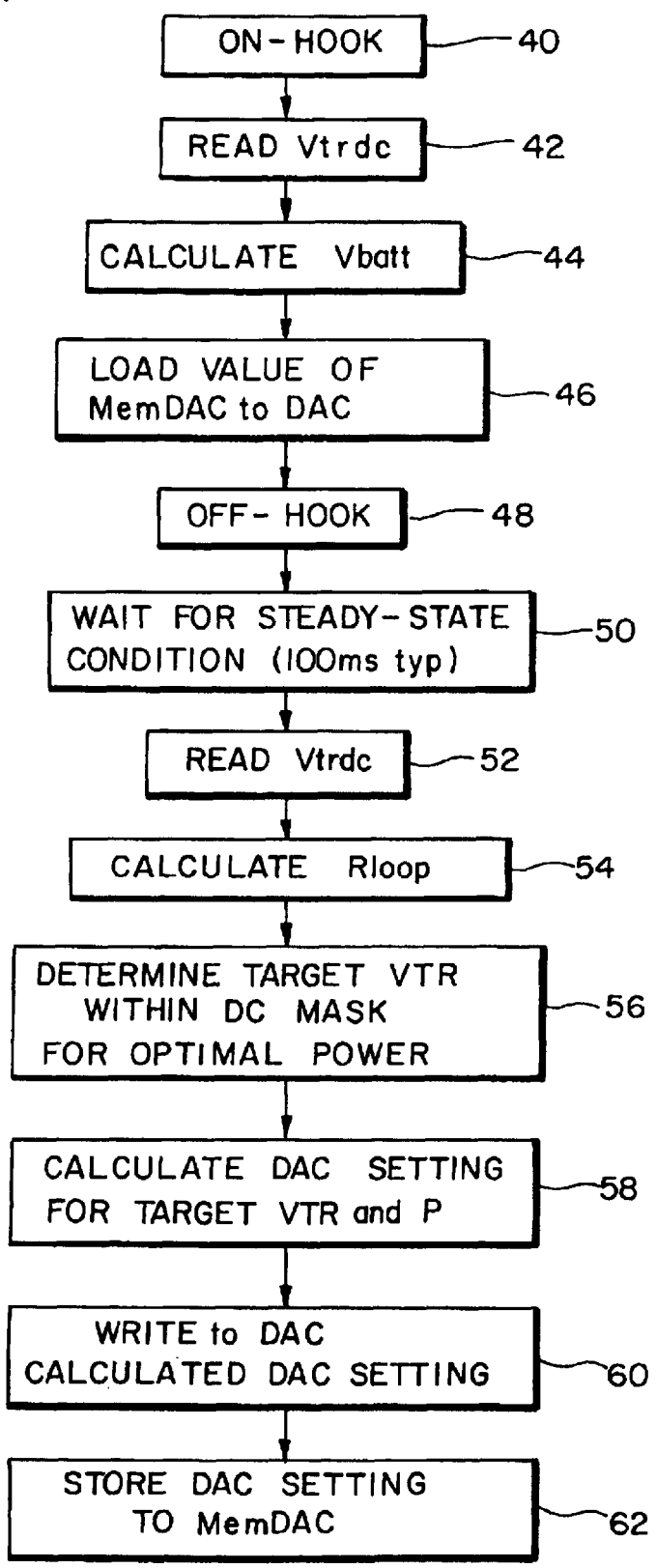
FIG. 4(A) is a flow-chart of the static DC line voltage control logic according to the present invention.

The details of the control logic used by the controller 30 in the static method are illustrated in the flow-chart of FIG. 4(A). A final DAC 20 setting that satisfies both the DC mask and power requirements can be stored by the controller 30 in a memory register MemDAC, and used as the initial DAC value (best guess) the next time the modem goes off-hook (steps 40–46). If the modem is stationary at one location (which is the case most of the time in practical applications), using the stored previous, optimal DAC value will result in fewer iterations and a faster execution of the algorithm.

Immediately before going off-hook, the controller measures Vbatt using equations [1] and [3] (VDAC=0), and writes an initial value to the DAC, which results in a known voltage VDAC. This setting can be an arbitrary default value, or it can be the DAC 20 setting used by the modem in the previous off-hook session and stored in register MemDAC.

After going off-hook (step 48), the controller waits (step 50) for a steady-state line voltage condition, typically 100 ms, measures Vtrdc, and calculates VTR and ITR using equations [1] and [2], respectively (step 52). Using equation [4], the controller 30 then calculates Rloop (step 54). Knowing Vbatt and Rloop, it is possible to calculate an optimal operating point (VTR) within the DC mask, which minimizes distortion and power dissipation in the line interface, for example (step 56).

Using equation [6], an optimal value for VDAC can be calculated (step 58), and a corresponding value is written to the DAC (step 60). This setting is also stored in register MemDAC (step 62), so it can be used as initial value for the DAC the next time the modem goes off-hook. This prevents unnecessary transients when the modem goes off-hook on the same telephone line as the previous off-hook session.

Static voltage control has the benefit of using Vbatt and Rloop to calculate the optimal operating point in the V-I domain, because all the DC circuit parameters of the loop are known. This method, however, does not use feedback from the line voltage and current to correct the possible discrepancies between calculated values and actual values.

Such discrepancies may arise as a result of erroneous instantaneous voltage readings by the ADC 10, or changing DC circuit parameters during the same off-hook session. It is not uncommon that the battery voltage at the CO changes over time during a power outage, for example, which would cause a considerable variation of Vbatt in the course of the same off-hook session. In this case, the controller 30 would not be able to detect a change in value of Vbatt.

Figure 9:
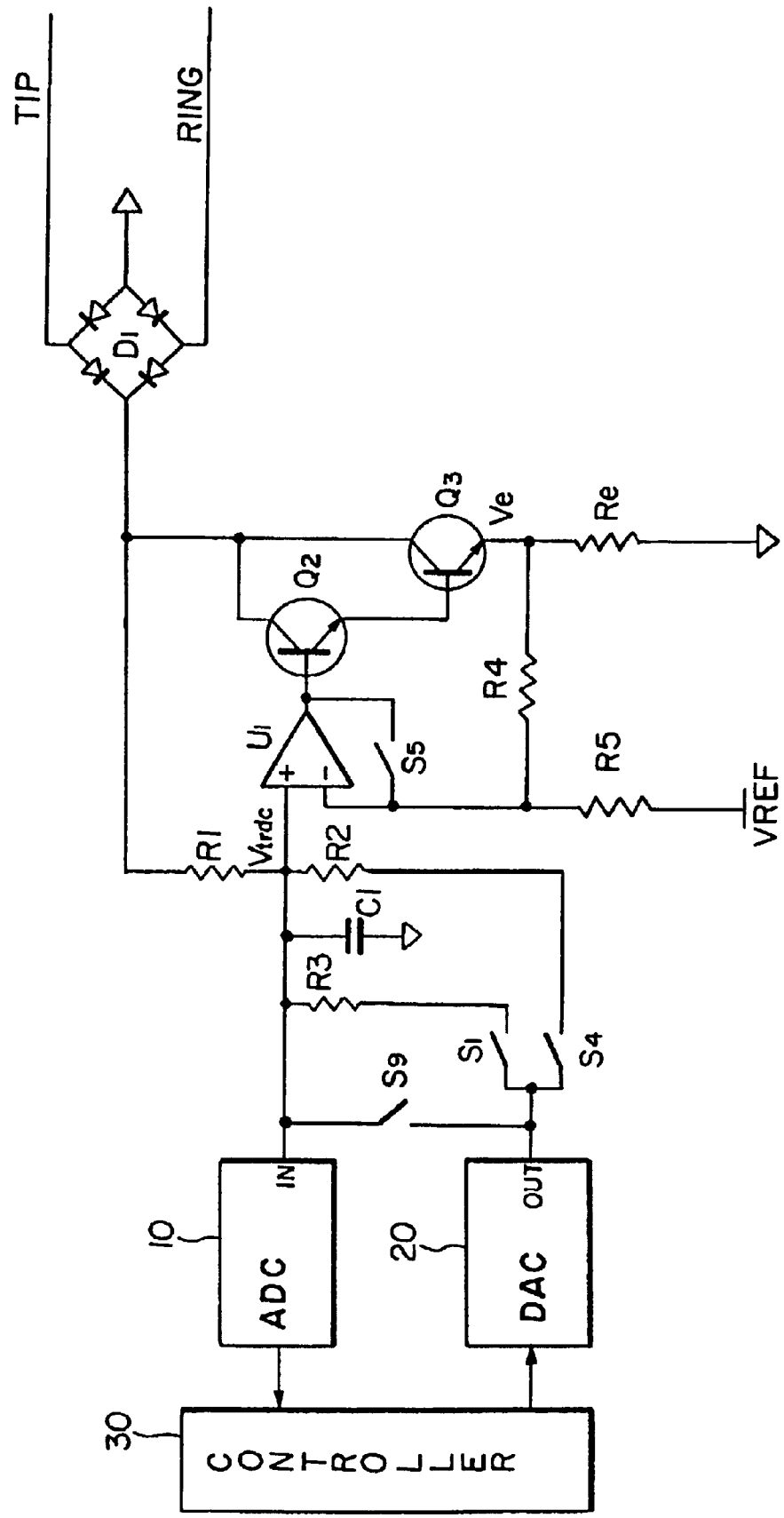
FIG. 9 is a schematic diagram of a telephone line interface circuit with DC line voltage control having DAC calibration.
Figure 10A:
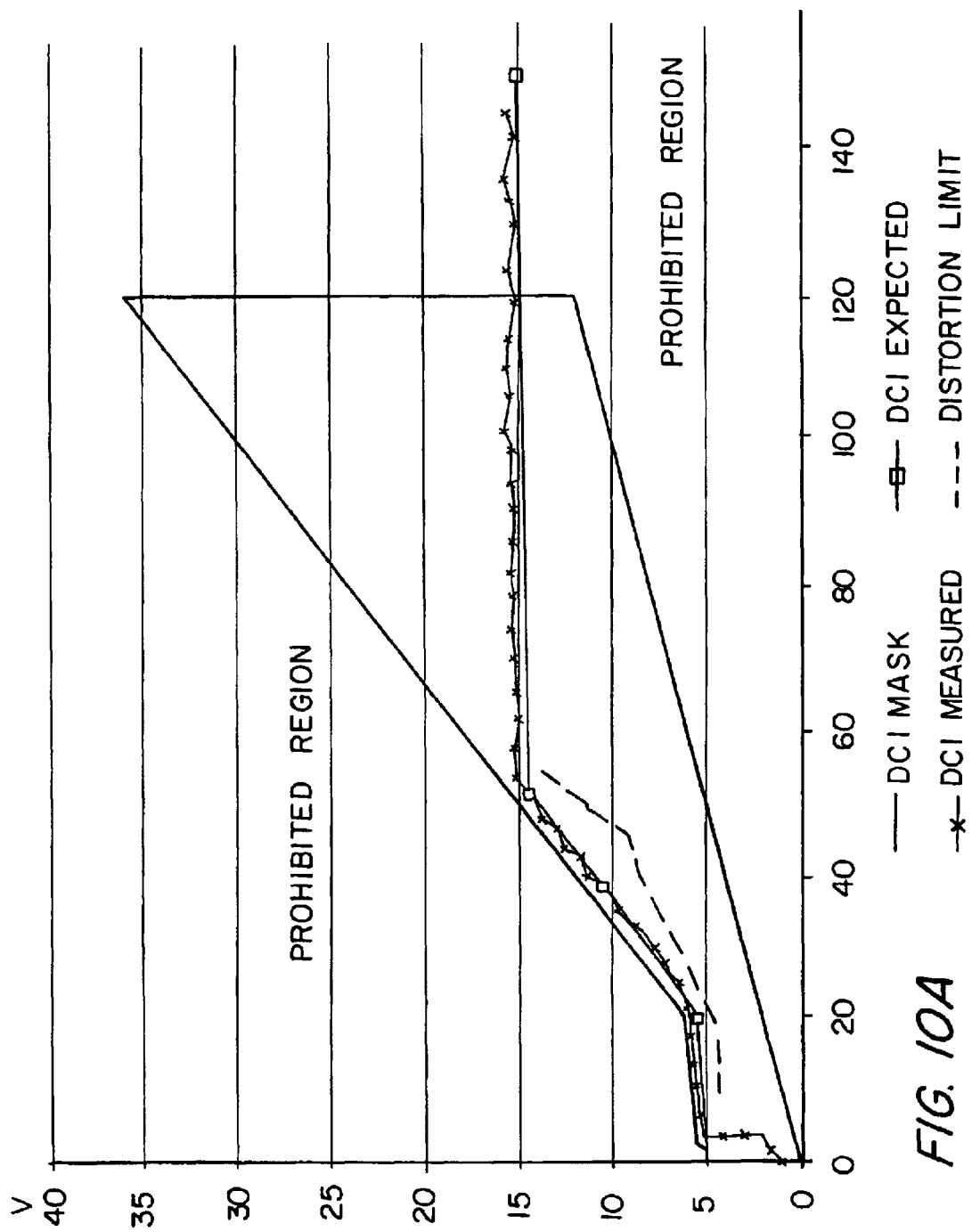
FIG. 10(A) is graph of a first DC mask.
Figure 10B:
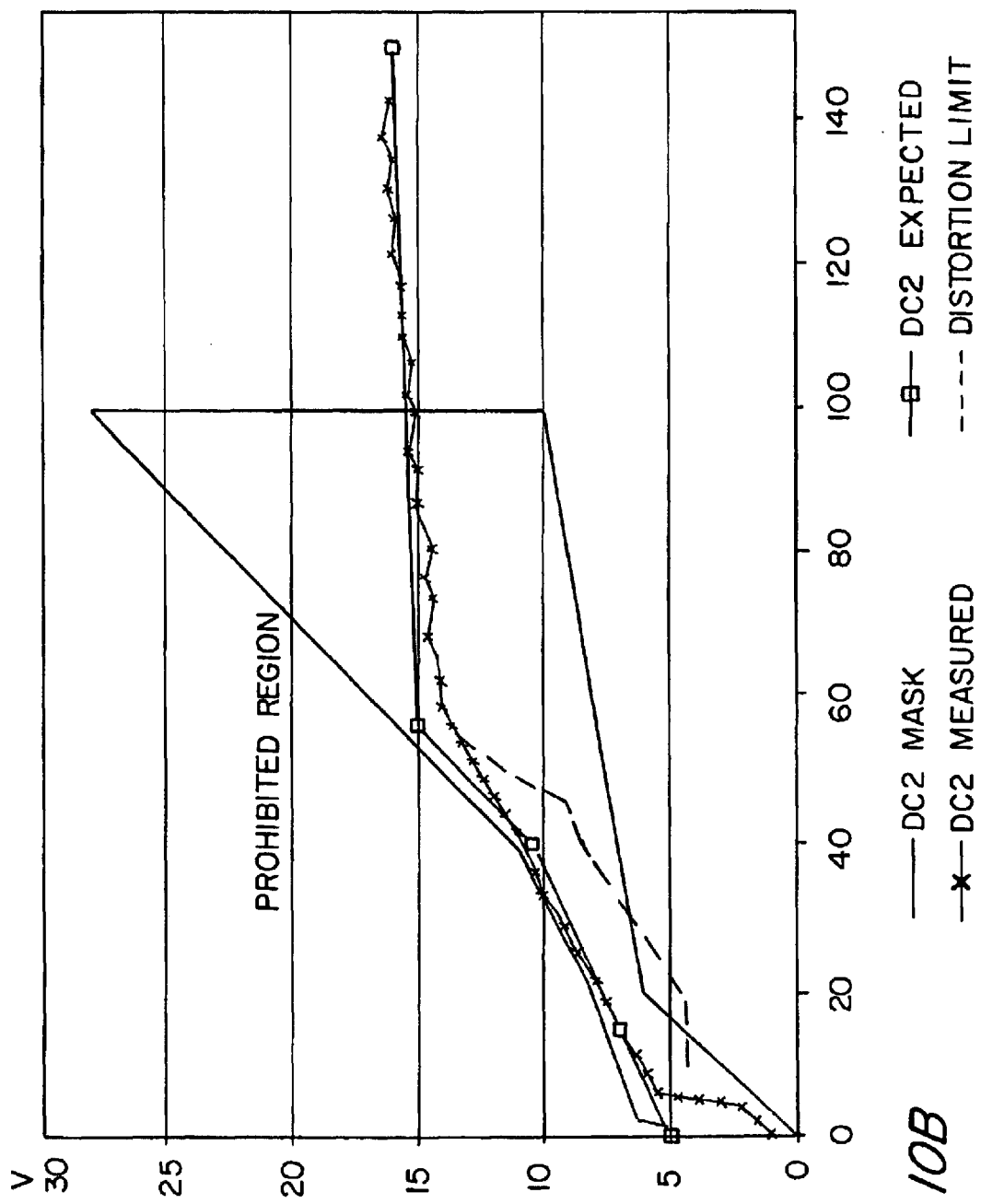
FIG. 10(B) is graph of a second DC mask.
Figure 10C:
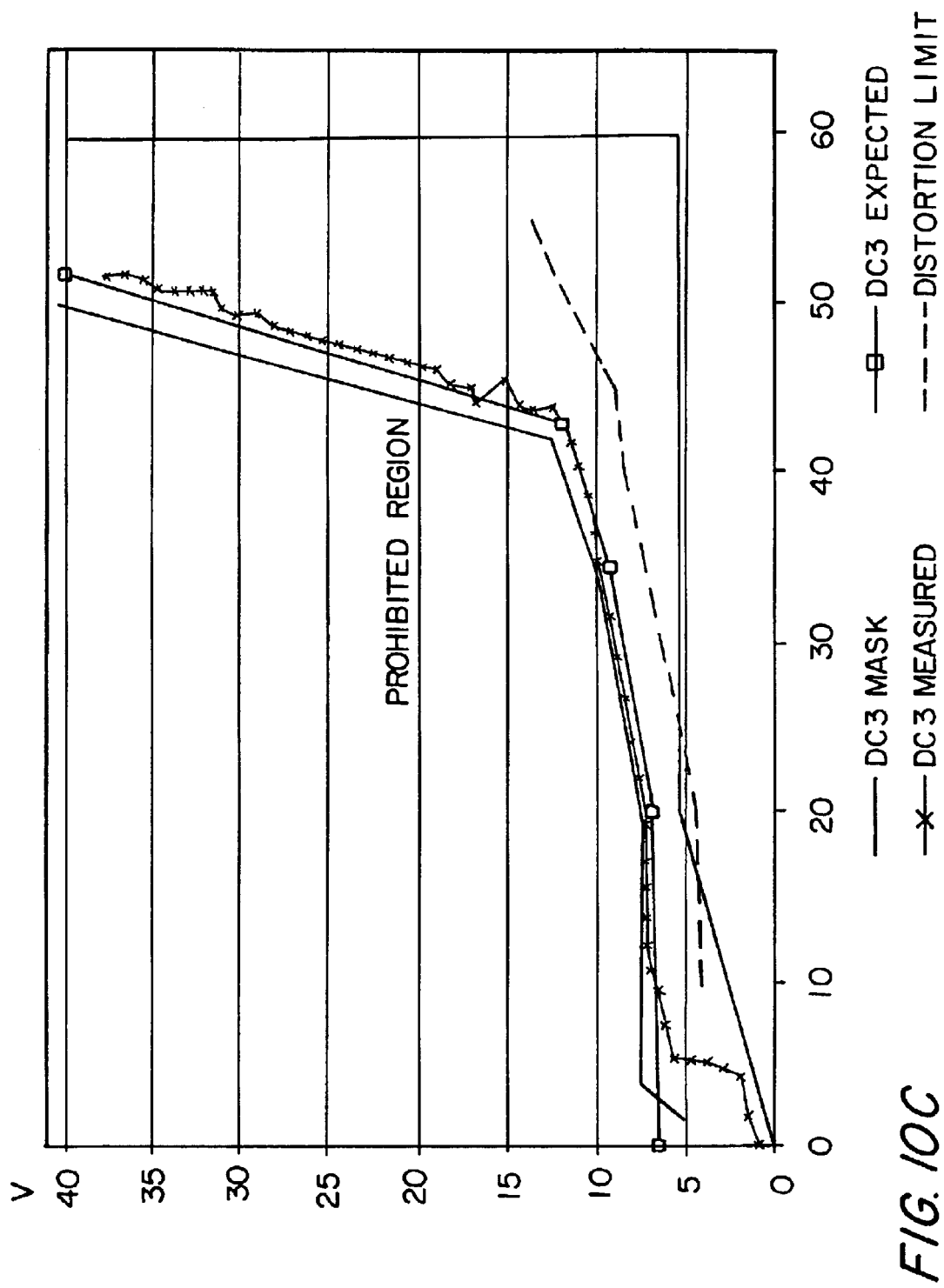
FIG. 10(C) is graph of a third DC mask.
Figure 10D:
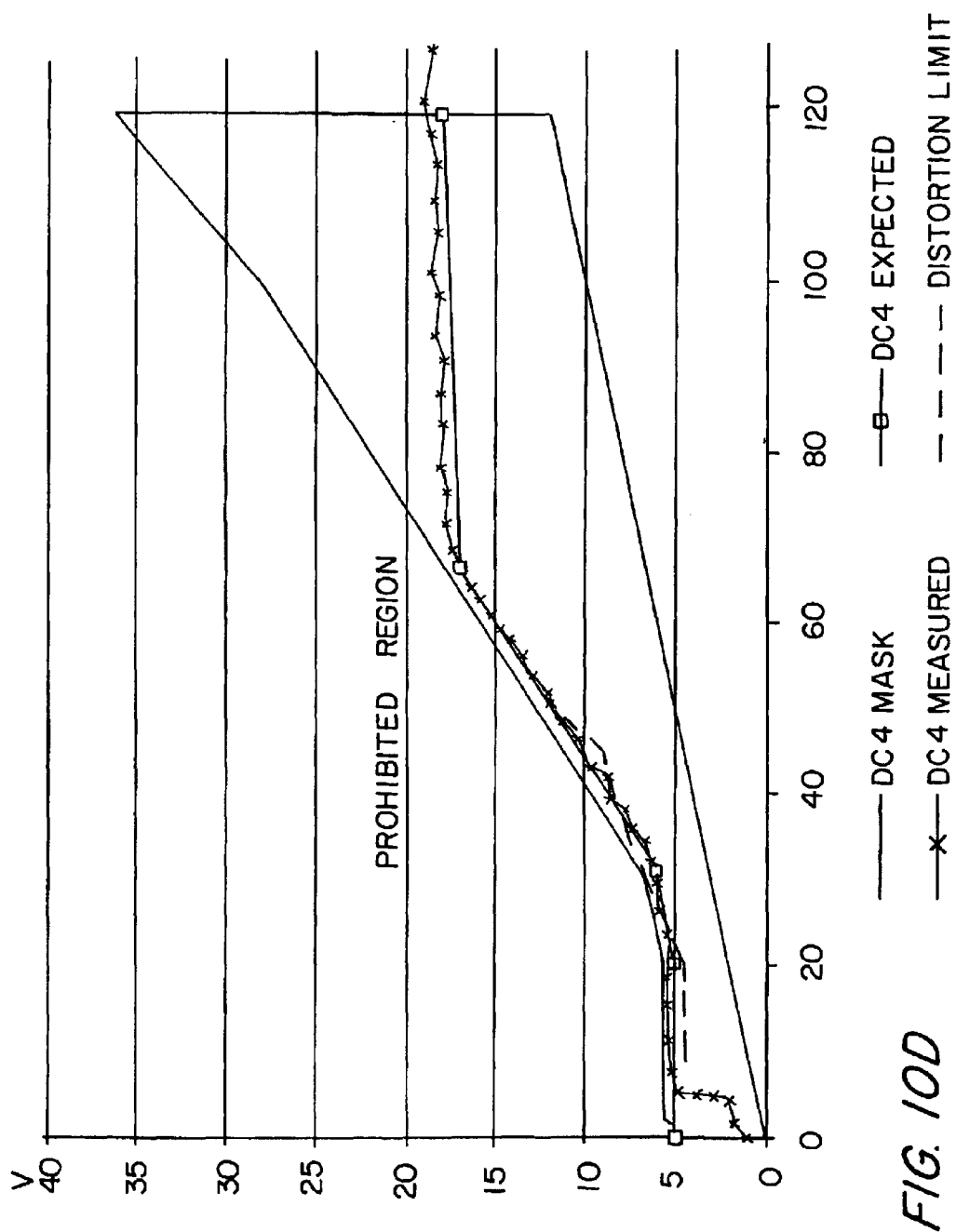
FIG. 10(D) is graph of a fourth DC mask.

Discrepancies between calculated and actual line voltage values can also be caused by relative error between the ADC 10 reading and DAC 20 output voltage, for example. Relative error can be minimized by calibrating the output voltage of the DAC 20 against the ADC 10 reading, as shown in FIG. 9. While the modem is idle, the controller 30 enables switch S9 and reads through the ADC 10 the output of the DAC 20 for each DAC setting. A look-up table representing calibrated values of the DAC 20 vs. the ADC 10 can be stored in a memory and used by the controller 30 when selecting an appropriate value for the DAC 20 to obtain a target VTR based on the ADC 10 reading.

Figure 4B:
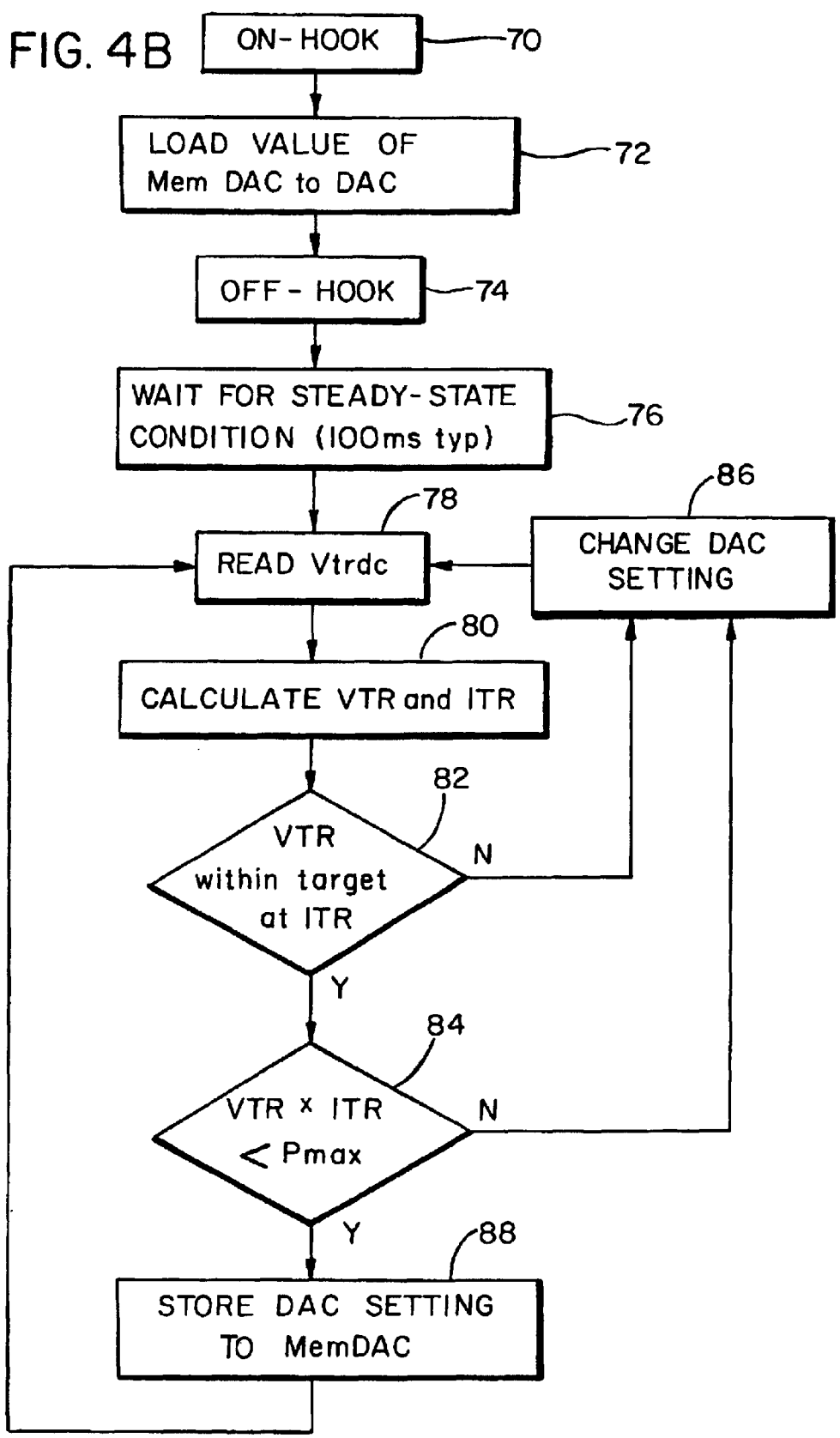
FIG. 4(B) is a flow-chart of the dynamic DC line voltage control logic according to the present invention.

The control logic for the dynamic control method will now be described with reference to FIG. 4(B). Immediately before going off-hook, the controller 30 writes an initial value to the DAC 20, which results in a known voltage VDAC (step 72). This setting can be an arbitrary default value, or it can be the DAC setting used by the modem in the previous communication session and stored in register MemDAC.

After going off-hook, the controller waits for a steady-state line voltage condition, typically 100 ms (step 76), measures Vtrdc (step 78), and calculates VTR and ITR using equations [1] and [2], respectively (step 80). If the value of VTR is outside the range specified by the DC mask at the current ITR (step 82), the controller 30 increases VDAC to decrease VTR or decreases VDAC to increase VTR, respectively (step 86).

The process continues until VTR is within a specified range of the target value. On each iteration, the controller 30 recalculates ITR as this value changes when the DAC 20 setting changes. The DAC setting can be changed one bit at a time, or starting with larger steps first and single bits later, depending on the difference between the VTR measured and the target value.

When VTR is within target, the controller 30 calculates the power dissipation in the modem line interface by multiplying the values of VTR and ITR, and compares this value with the maximum power rating Pmax (step 84). Since the voltages at Re and other points in the modem circuit are known, it is possible to calculate the power dissipation in each component at any one time and compare it with their individual power rating. If the power rating is within limits, the controller 30 stores the DAC setting in register MemDAC, so it can be used as initial value for the DAC 20 the next time the modem goes off-hook. This prevents unnecessary transients when the modem goes off-hook on the same telephone line as the previous off-hook session.

Dynamic voltage control has the benefit of using continuous feedback from the line voltage and current, whereby the controller 30 can correct the DAC 20 setting recursively until the target values are obtained. Furthermore, the algorithm can run periodically to maintain the voltage and power within the target, in case the DC loop parameters change during an off-hook session. In this method, however, the controller 30 does not use knowledge of Vbatt and Rloop and cannot optimize the values of VTR and ITR to minimize distortion and power dissipation, within the V-I domain specified by the DC mask.

Figure 4C:
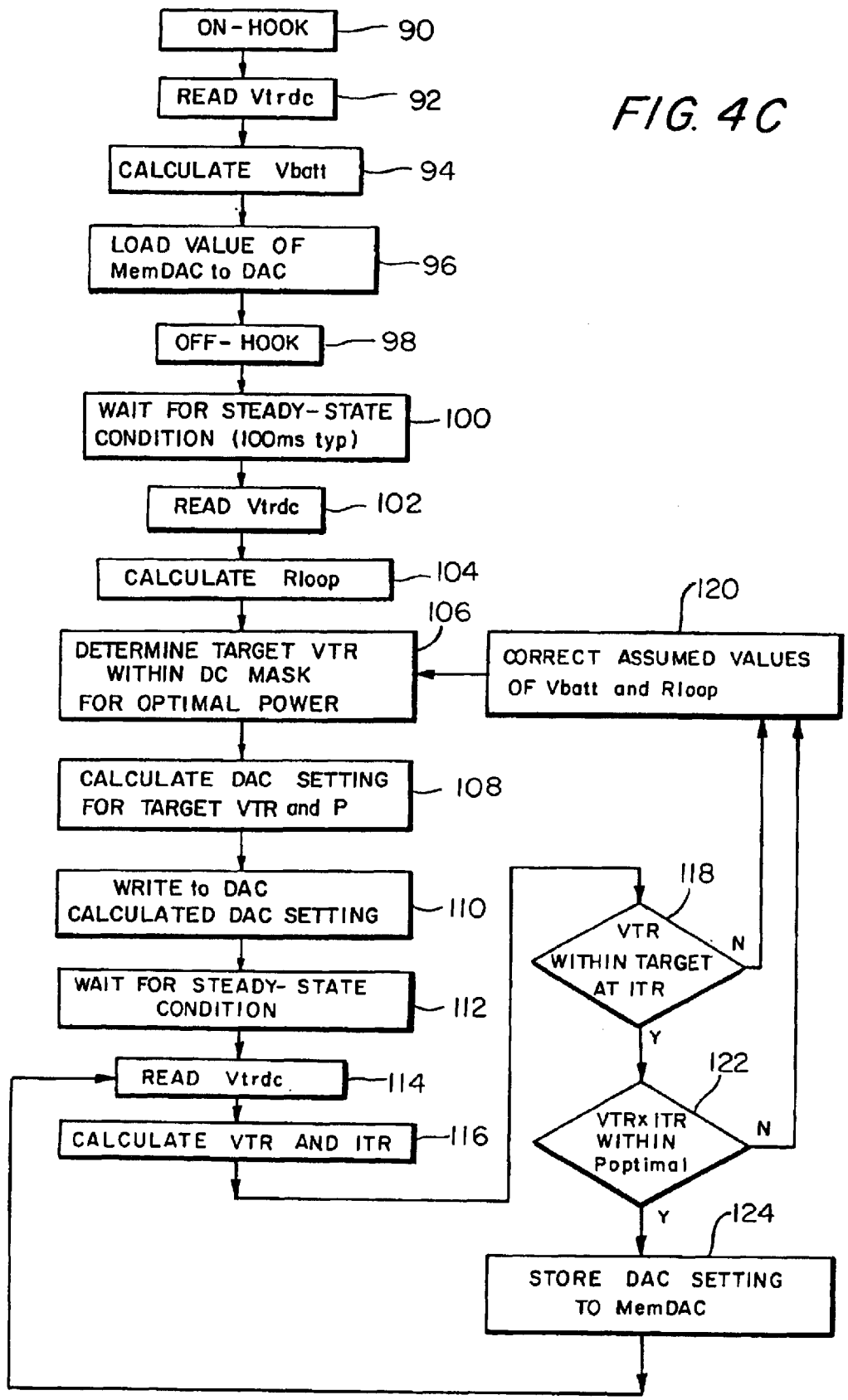
FIG. 4(C) is a flow-chart of an optimized DC line voltage control logic according to a preferred embodiment of the present invention.

An optimal voltage control solution combines the benefits of the static and dynamic methods, and thus overcomes their disadvantages. In the presently preferred embodiment of the present invention, this is the method used by the controller 30. However, those skilled in the art can choose the best method for a given application. A flowchart of this optimal method is shown in FIG. 4(C).

Immediately before going off-hook, the controller 30 measures Vbatt using equations [1] and [3] (VDAC=0), and writes an initial value to the DAC 20, which results in a known voltage VDAC. This setting can be an arbitrary default value, or it can be the DAC setting used by the modem in the previous off-hook session and stored in a register MemDAC (steps 90–96).

After going off-hook (step 98), the controller waits for a steady-state line voltage condition, typically 100 ms (step 100), measures Vtrdc, and calculates VTR and ITR using equations [1] and [2], respectively (step 102). Using equation [4], the controller 30 then calculates Rloop (step 104). Knowing Vbatt and Rloop, it is possible to calculate an optimal operating point (VTR) within the DC mask, which minimizes distortion and power dissipation in the line interface, for example (step 106). Using equation [6], an optimal value for VDAC can be calculated, and a corresponding value is written to the DAC (step 110).

After a short delay, to allow for a steady-state operating condition (step 112), the controller 30 again measures Vtrdc (step 114) and calculates VTR and ITR using equations [1] and [2], respectively (step 116). If VTR and ITR are outside the optimal target range predicted by the expected values of Vbatt and Rloop (step 118), the controller 30 corrects the assumed values of Vbatt and Rloop and recalculates VDAC (step 120). The process continues recursively until VTR and ITR are within the optimal target in the V-I domain of the DC mask, and the power is within predicted limits (step 122). The controller 30 stores the DAC setting in register MemDAC (step 124), so it can be used as initial value for the DAC 20 the next time the modem goes off-hook. This prevents unnecessary transients when the modem goes off-hook on the same telephone line as the previous off-hook session.

The controller 30 can also determine the CO battery voltage Vbatt and the loop resistance Rs while off-hook, without necessarily reading the on-hook line voltage Vtr. Since equation [4] is true for any values of Vtr and Itr, the controller can take two independent readings of Vtr and Itr at state (1) and state (2). These two states can differ from each other by a different setting of the DAC, for example, or by having switch S1 enabled or disabled, respectively. The following system of two equations in two unknowns, Vbatt and Rloop, can then be written:

$$V\text{batt}-R\text{loop} \times Itr(1) = Vtr(1)$$

$$V\text{batt}-R\text{loop} \times Itr(2) = Vtr(2) \qquad [8]$$

and the controller 30 can determine the values of Vbatt and Rloop.

The only error allowed by this method is due to the absolute inaccuracy of the ADC 10, and the tolerance of components used in the determination of VTR and ITR. These quantities can be specified within reasonable limits and result in negligible offset. Some of the quantities that can be defined based on acceptable margins of error are the resolution of the ADC 10 and DAC 20 (typically 6 to 8 bits), the DC offset of the op-amp U1, and the tolerance of resistors R1, R2, R3, and Re, typically 1% to 5% for practical applications.

The control logic of the present invention may be implemented by various means known to those skilled in the art, including either a hardware or software implementation.

As stated above, switch S1 is enabled to increase the dynamic range of the ADC 10 with respect to VTR, by adding resistor R3 in parallel with R so that a relatively large VTR can be measured within the limited voltage range of the ADC 10 (typically 0–4V). For example, if VTR is expected to be as high as 60V while the modem is on-hook, R3 is chosen so that the ratio (R2//R3)/(R1+R2//R3) is approximately 15 (60V/4V).

Figure 11:
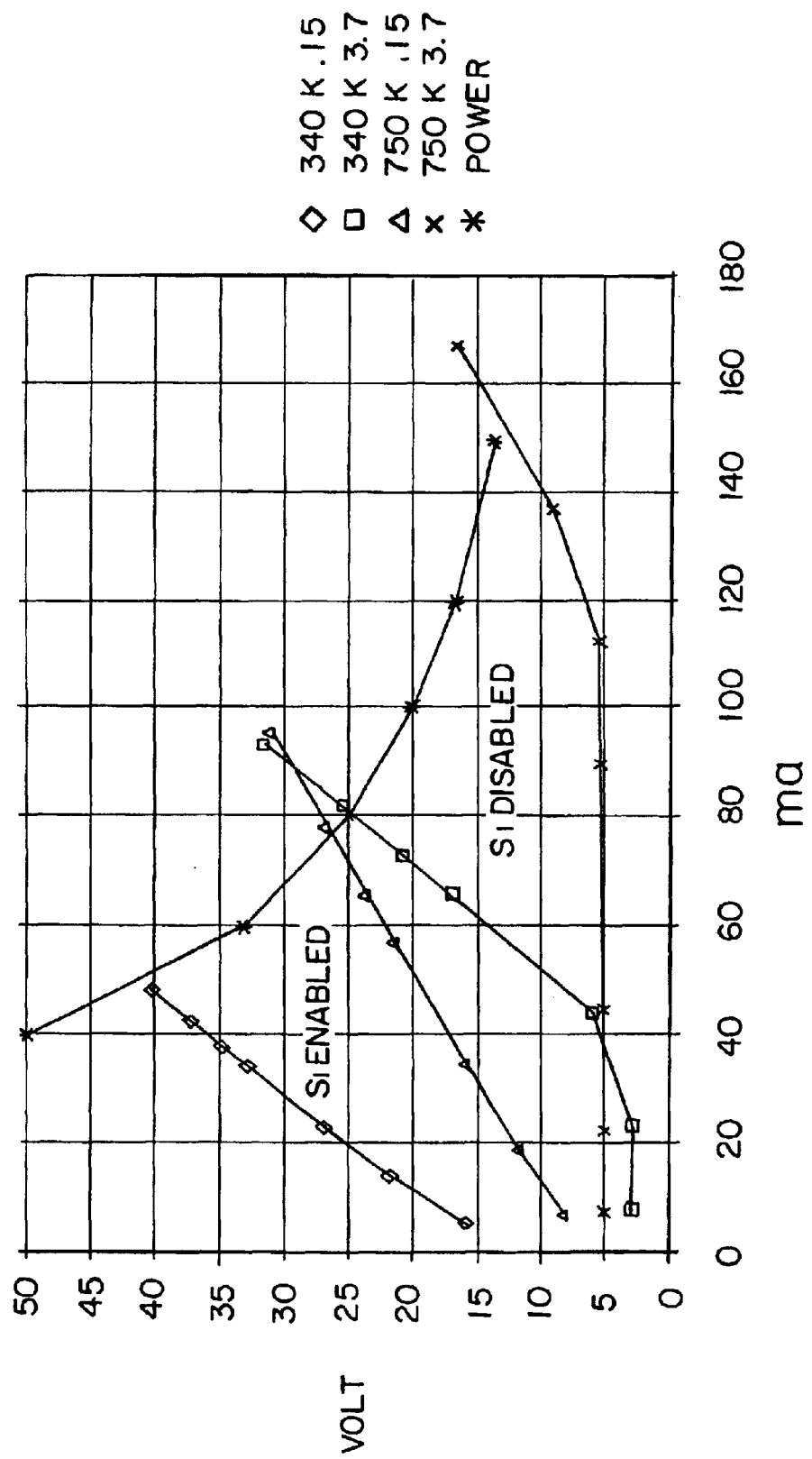
FIG. 11 is a graph of the typical operating range of a telephone line interface circuit with DC line voltage control.

Switch S1 is also enabled while off-hook, typically to comply with TBR21 specifications (Europe) whereby ITR is limited to 60 mA and VTR can be as high as 40V. The graph shown in FIG. 11 displays two operating regions in the V-I domain, for R3=340 K and R2 750 K region, wherein each region can be selected by enabling and disabling S1, respectively. In FIG. 11, a power curve is also drawn. This represents an upper limit on the maximum power dissipation of the transistor Q1 and represents an upper boundary on the other sets of curves.

Figure 5:
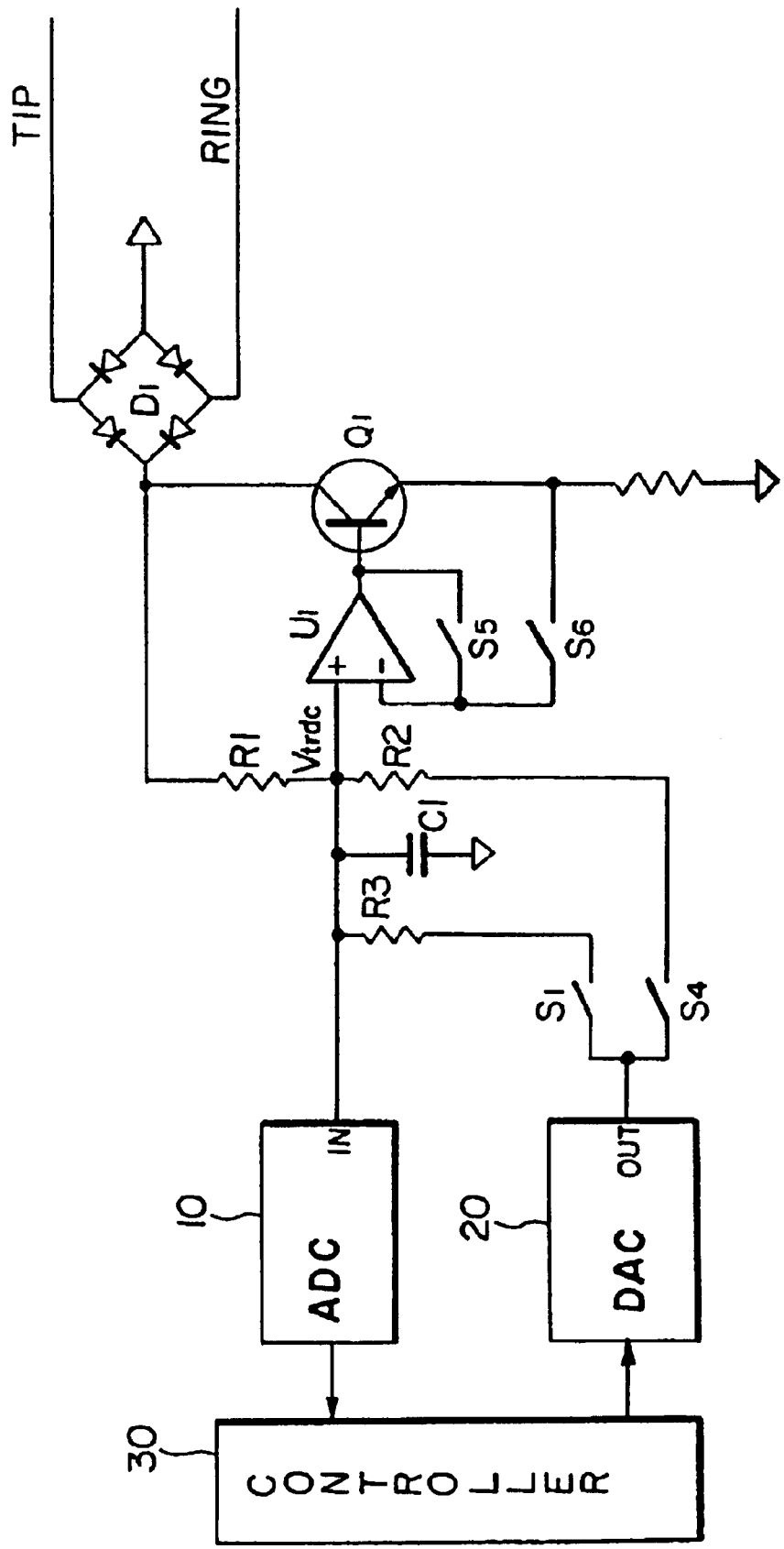
FIG. 5 is a schematic diagram of a telephone line interface circuit with DC line voltage control and having multiplier switches.

An alternate embodiment of the present invention is shown schematically in FIG. 5. In this embodiment, the controller 30 can control two switches, S1 and a second switch S4, connected to the DAC 20. This allows even greater control over the range of desired V-I characteristics as the values of R3 and R2 can be chosen to be independent of each other. Additionally, two switches S5 and S6 have been added to the feedback line of the op-amp U1. The controller 30 can select whichever switch provides the best "multiplier" factor for the resistor divider. Specifically, the values of R2 and R3 can be chosen to be as large as possible to minimize the multiplier factor, and the controller 30 can select either switch S5 or S6 to cover the operating range in the V-I domain as required.

Figure 2:
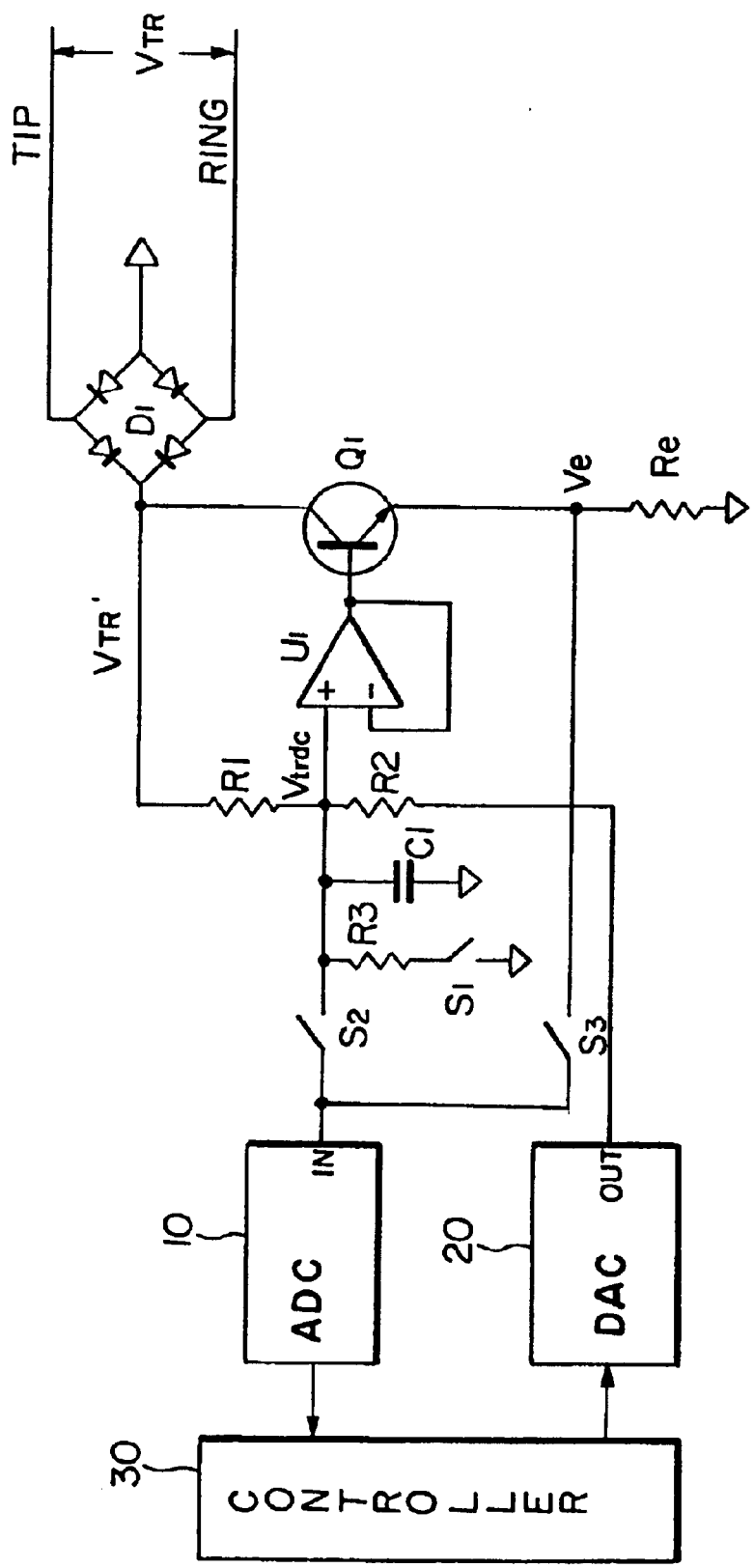
FIG. 2 is a schematic diagram of a telephone line interface circuit according to a second embodiment of the present invention having DC line voltage control with direct current reading.
Figure 6:
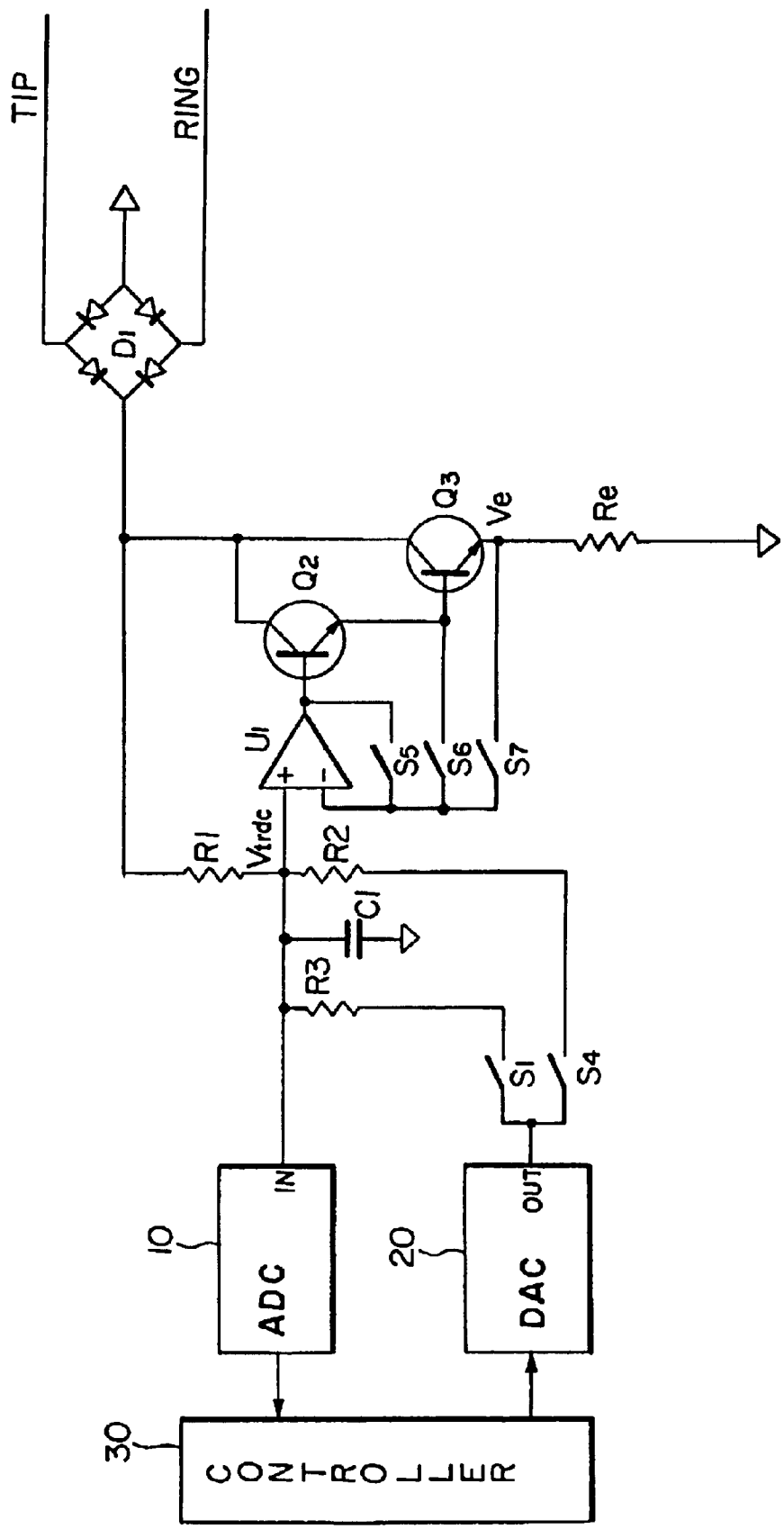
FIG. 6 is a schematic diagram of a telephone line interface circuit with DC line voltage control using a Darlington pair configuration.
Figure 7:
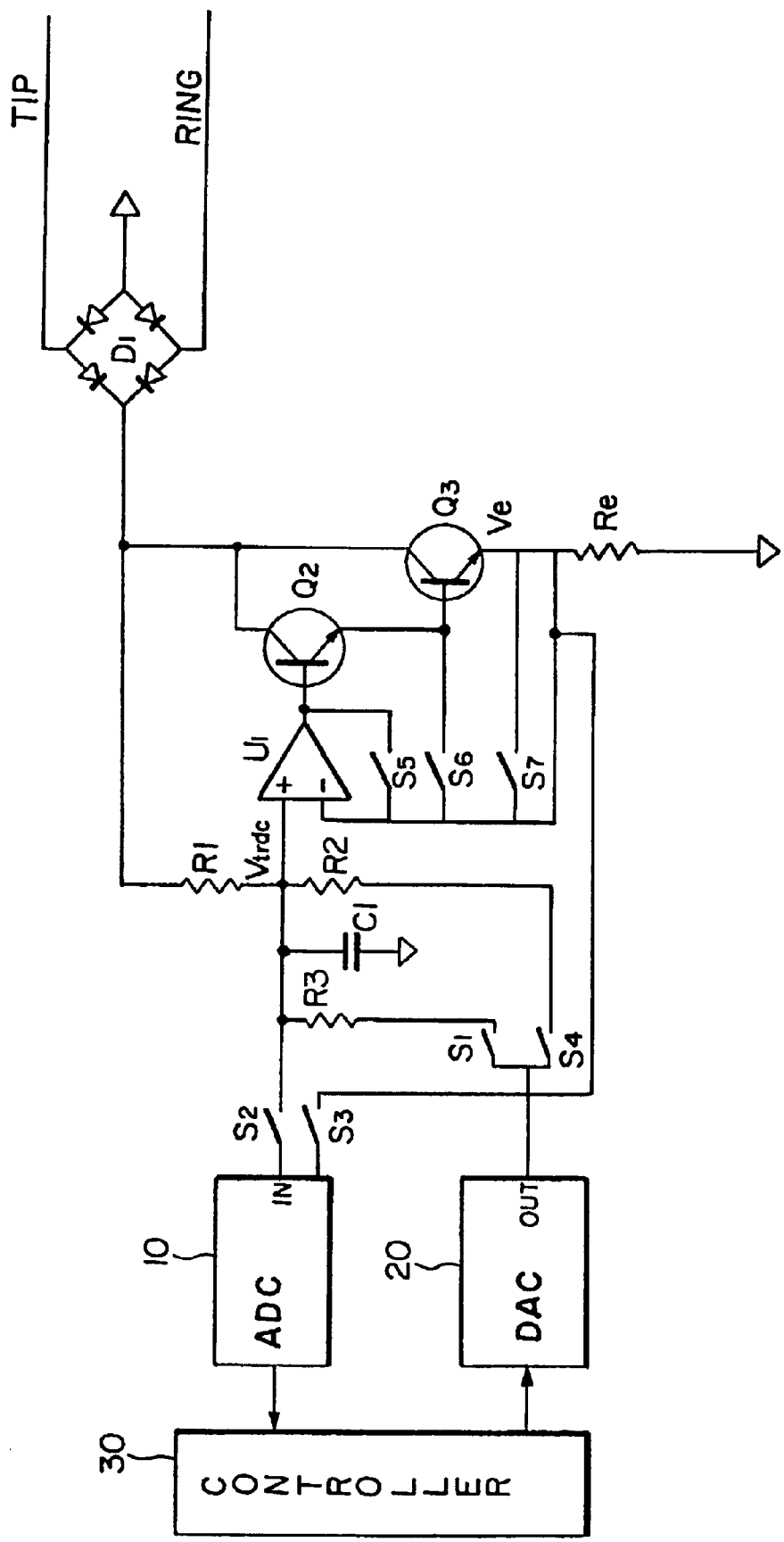
FIG. 7 is a schematic diagram of a telephone line interface circuit with DC line voltage control using a Darlington pair configuration and having direct current reading.

Another embodiment of the present invention is illustrated schematically in FIG. 6. The single transistor Q1 described above has been replaced with a Darlington pair Q2, Q3. The Darlington pair configuration allows for larger line currents with less diode current from op-amp U2. Similarly, three switches have been added to the op-amp's U1 feedback to provide an extra "multiplier" enhancement option, as described in reference to FIG. 5. The features of circuits described in FIG. 5 and 6 can be combined with the direct current reading of the circuit of FIG. 2, as shown in FIG. 7. Two switches S1 and S4 are used to select the appropriate resistor divider network. Switches S2 and S3 are used to select either a voltage or a current reading, respectively, and switches S5, S6 and S7 control the feedback to the op-amp U1.

Closing switches S5, S6, and S7 causes the following equations to be true, respectively, regardless of the values of R1, R2, AND R3:

$$Vtrdc = Ve + Vbe(Q3) + Vbe(Q2) \text{ for } S5, \text{ closed,}$$

which can be written as $$Ve = Vtrdc - 1.4V$$

assuming the base-emitter voltage to be 0.7V for each transistor $$Vtrdc = Ve + Vbe(Q3) \text{ for } S6 \text{ closed,}$$

which can be written as $$Ve = Vtrdc - 0.7V$$

and $$Vtrdc = Ve \text{ for } S7 \text{ closed.}$$

Since the line current Itr is equal to Ve/Re, using the same multiplier factor (resistor divider ratio) and for the same Vtrdc, it is possible to increase Itr in steps of 0.7V/Re. This effectively allows additional degrees of freedom in loop current control, which can be used favorably to reduce the multiplier factor.

Figure 8:
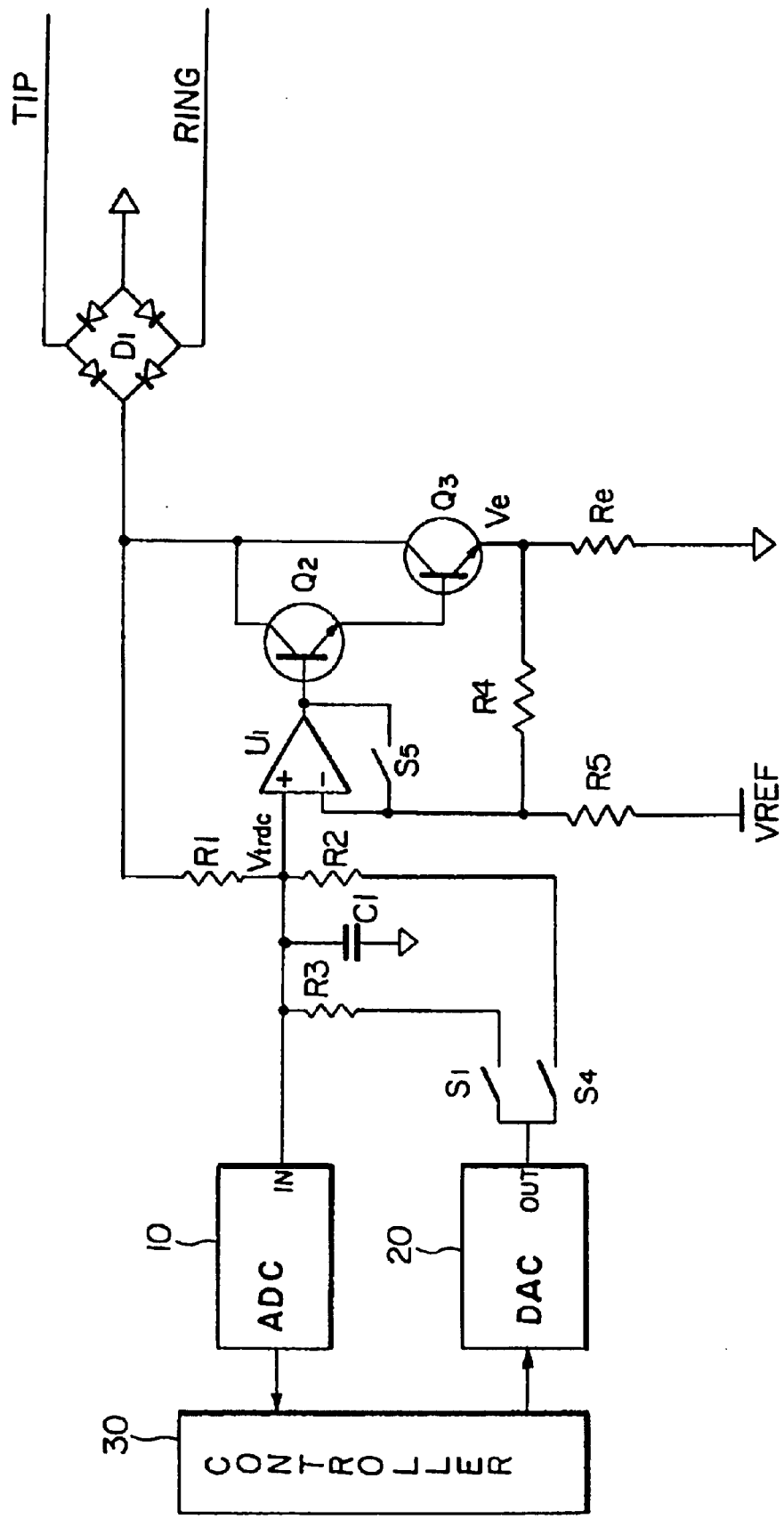
FIG. 8 is a schematic diagram of a telephone line interface circuit with DC line voltage control and having analog multiplier compensation.

FIG. 8 shows a circuit configuration equivalent to FIG. 6, wherein switches S6 and S7 have been replaced by two analog feedback resistors R4 and R5. Resistor R4 is connected between the emitter of Q3 and the negative feedback of U1, whereas resistor R5 is connected between the negative feedback of U1 and an arbitrary voltage reference VREF.

By a suitable selection of voltage VREF and resistor ratio R4/R5, it is possible to obtain equivalent results to the activation of switches s6 and S7 in the digital domain. For example, in FIG. 6 switch S7 would normally be closed for large values of Itr and switch S6 would normally be closed for medium values of Itr. In FIG. 8, if VREF is chosen to be equal to the maximum voltage Ve expected for the maximum current Itr, it can be easily seen that for large values of Itr the following is true:

$$Ve = VREF = Vtrdc \text{ (this is equivalent to having switch S7 closed)}$$

For medium values of Itr, Ve is less than VREF and the ratio of R4/R5 can be chosen so that Vtrdc is approximately equal to Ve+0.7V, which is equivalent to having switch S6 closed.

The preferred embodiment is shown in FIG. 9 with the addition of a DAC calibration switch S9. The operation and scope of the circuitry of FIG. 9 has already been discussed.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A telephone line interface circuit having an electronic inductor, the circuit comprising:
    an analog-to-digital converter (ADC) connected to a node formed by a voltage divider;
    a digital-to-analog converter (DAC) connected to a base of an electronic inductor transistor;
    a controller connected to the ADC and to the DAC;
    a resistor connected between the input of the ADC and a first switch to ground.

2. The circuit of claim 1, wherein the controller reads a first voltage from the ADC and provides a compensating signal to the DAC, such that the DAC outputs a second voltage in response to the first voltage from the ADC.

3. The circuit of claim 2, further comprising an operational amplifier connected to the base of the electronic inductor transistor, the operational amplifier having a positive input connected to the voltage divider node, and a negative input connected to an emitter of the electronic inductor transistor.

4. The circuit of claim 3, wherein the voltage divider comprises at least two resistors.

5. The circuit of claim 2, wherein electronic inductor transistor comprises a Darlington transistor pair.

6. The circuit of claim 5, wherein the output voltage of the DAC is selectably output to the voltage divider node through one of two resistance paths.

7. The circuit of claim 6, further comprising an operational amplifier connected to a base of the Darlington pair, the operational amplifier having a positive input connected to the voltage divider node, and a negative input selectably connected to one of: an output of the operational amplifier; an emitter-base junction of the Darlington pair; or an emitter output of the Darlington pair.

8. The circuit of claim 7, wherein the ADC is selectably connected to either a first voltage from the voltage divider, or an emitter voltage, wherein the controller outputs a compensating signal to the DAC, such that the DAC outputs a second voltage in response to either the first voltage or the emitter voltage from the ADC.

9. The circuit of claim 2, wherein the output voltage of the DAC is selectably output to the voltage divider node through one of two resistance paths.

10. The circuit of claim 9, further comprising an operational amplifier connected to the base of the electronic inductor transistor, the operational amplifier having a positive input connected to the voltage divider node, and a negative input selectably connected either an emitter of the electronic inductor transistor or to an output of the operational amplifier.

11. A telephone line interface circuit having an electronic inductor, the circuit comprising:
    an analog-to-digital converter (ADC) connected to a node formed by a voltage divider, wherein the voltage divider comprises at least two resistors;
    a digital-to-analog converter (DAC) connected to a base of an electronic inductor transistor;
    a controller connected to the ADC and to the DAC;
    a third resistor connected between the input of the ADC and a first switch to ground;
    an operational amplifier connected to the base of the electronic inductor transistor, the operational amplifier having a positive input connected to the voltage divider node, and a negative input connected to an emitter of the electronic inductor transistor, wherein the controller reads a first voltage from the ADC and provides a compensating signal to the DAC, such that the DAC outputs a second voltage in response to the first voltage from the ADC.

12. The circuit of claim 11, wherein the controller controls the first switch in order to increase the dynamic range of the ADC.

13. A telephone line interface circuit having an electronic inductor, the circuit comprising:
    an analog-to-digital converter (ADC) connected to a node formed by a voltage divider;
    a digital-to-analog converter (DAC) connected to a base of an electronic inductor transistor;
    a controller connected to the ADC and to the DAC, wherein the ADC is selectably connected to either a first voltage from the voltage divider, or an emitter voltage, wherein the controller outputs a compensating signal to the DAC, such that the DAC outputs a second voltage in response to either the first voltage or the emitter voltage from the ADC.

14. The circuit of claim 13, further comprising an operational amplifier connected to the base of the electronic inductor transistor, the operational amplifier having a positive input connected to the voltage divider node, and a negative input connected to the operational amplifier's output node.

15. The circuit of claim 14, wherein the voltage divider comprises at least two resistors.

16. The circuit of claim 15, further comprising a third resistor connected between the input of the ADC and a first switch to ground.

17. The circuit of claim 16, wherein the controller controls the first switch in order to increase the dynamic range of the ADC.

18. The circuit of claim 17, wherein an emitter resistor is connected to an emitter of the electronic inductor transistor, the emitter resistor having a known value, such that the controller can determine the Tip and Ring current.

19. A telephone line interface circuit comprising:
    a Darlington pair comprising a first transistor and a second transistor;
    a voltage divider comprising a first resistor and a second resistor, a junction of the resistors forming a first node;
    an analog-to-digital converter (ADC) having an input connected to the node;
    a digital-to-analog converter (DAC) having an output;
    a first switch connected between the output of the DAC and a third resistor, the third resistor having an opposite end connected to the ADC input;
    a second switch connected between the output of the DAC and the second resistor;
    an emitter resistor connected to an emitter of the second transistor;
    a fourth resistor connected between the emitter of the second transistor and a second node;
    a fifth resistor connected between the second node and a reference voltage;
    an operational amplifier having an output connected to a base of the first transistor, a positive input connected to the first node, and a negative input connected to the second node; and
    a feedback line selectably connected between the output of the operational amplifier and the second node.

20. The circuit of claim 19, further comprising a capacitor connected between the first node and a ground.

21. The circuit of claim 20, further comprising a switch connected between the input of the ADC and the output of the DAC.

22. The circuit of claim 20, wherein the first resistor and a collector of the Darlington pair are connected to a diode bridge connected across a Tip and Ring signal lines.

23. A telephone interface circuit comprising:
    a transistor having an emitter, a base and a collector;
    a voltage divider comprising a first resistor and a second resistor, a junction of the resistors forming a node;
    an operational amplifier having an output connected to the base of the transistor, a negative input connected to the emitter, and a positive input connected to the node;
    an emitter resistor connected to the emitter;
    an analog-to-digital converter (ADC) having an input connected to the node;
    a digital-to-analog converter (DAC) having an output connected to the first resistor;
    a controller connected to the ADC and the DAC;
    a third resistor connected between the node and a first switch to ground.

24. The circuit of claim 23, further comprising a capacitor connected between the node and ground.

25. The circuit of claim 24, wherein the first resistor and the collector of the transistor are connected to a diode bridge connected across a Tip and Ring signal lines.

26. The circuit of claim 25, wherein the negative input of the operational amplifier is connected to the operational amplifier output through a second switch, the negative input of the operational amplifier connected to the emitter though a third switch.

27. The circuit of claim 26, wherein the input of the ADC is switchably connected to either the node or the enlitter of the transistor.

28. The circuit of claim 27, wherein the output of the DAC is switchably connected to either the second or third resistors.

29. The circuit of claim 28, wherein the negative input of the operational amplifier is switchably connected to either the output of the operational amplifier or to the emitter.

30. The circuit of claim 29, wherein the transistor comprises a Darlington pair.

31. The circuit of claim 23, wherein the controller controls the DAC output based upon a predetermined DC mask and/or power requirement.

32. A static method for controlling a DC line current in a telephone line interface circuit, the method comprising the steps of:
    reading a voltage Vtrdc;
    calculating a resistance Rloop;
    determining a target voltage VTR based upon a DC mask and power characteristics; and
    calculating a digital signal value needed to adjust the circuit to the target voltage.

33. A dynamic method for controlling a DC line current in a telephone line interface circuit, the method comprising the steps of:
    (a) reading a voltage Vtrdc;
    (b) calculating a voltage VTR and a current ITR;
    (c) determining whether the voltage VTR is within a desired range at current ITR, and if not, adjusting a digital signal value needed to adjust the circuit to the desired range; and
    (d) repeating steps (a)–(c) until the voltage VTR is within the desired range.

34. The method of claim 33, further comprising the step of:
    (e) determining whether a power value (VTR×ITR) is less than a maximum power value, and if not, adjusting a digital signal value needed to adjust power value to be less than the maximum power value; and
    (f) repeating steps (a)–(e) until the power level is below the maximum power value.

35. A method for controlling a DC line current in a telephone line interface circuit, the method comprising the steps of:
    (a) reading a voltage Vtrdc;
    (b) calculating a voltage Vbatt;
    (c) calculating a resistance Rloop;
    (d) determining a target voltage VTR based upon a DC mask and power characteristics;
    (e) calculating a digital signal value needed to adjust the circuit to the target voltage;

(f) saving the digital signal value;
(g) waiting for a steady state condition;
(h) reading the voltage Vtrdc again;
(i) calculating a voltage VTR and a current ITR;
(j) determining whether the voltage VTR is within a desired range at current ITR, and if not, updating the values of Vbatt and Rloop; and
(k) repeating steps (d)–(j) until the voltage VTR is within the desired range.

36. The method of claim 35, further comprising the steps of:
(l) determining whether a power value (VTR×ITR) is less than a maximum power value, and if not, updating the values of Vbatt and Rloop; and
(m) repeating steps (d)–(l) until the power level is below the maximum power value.

* * * * *